United States Patent
Sugiyama

(10) Patent No.: US 9,507,235 B2
(45) Date of Patent: Nov. 29, 2016

(54) OPTICAL MODULE AND TRANSMITTING APPARATUS

(71) Applicant: Fujitsu Optical Components Limited, Kawasaki-shi, Kanagawa (JP)

(72) Inventor: Masaki Sugiyama, Sagamihara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 24 days.

(21) Appl. No.: 14/714,408

(22) Filed: May 18, 2015

(65) Prior Publication Data

US 2016/0011486 A1    Jan. 14, 2016

(30) Foreign Application Priority Data

Jul. 11, 2014  (JP) ................................ 2014-143418

(51) Int. Cl.
  *H04B 10/556*  (2013.01)
  *G02F 1/21*  (2006.01)
  *G02F 1/01*  (2006.01)
  *G02F 1/03*  (2006.01)
  *G02F 1/225*  (2006.01)

(52) U.S. Cl.
  CPC ............. *G02F 1/21* (2013.01); *G02F 1/0121* (2013.01); *G02F 1/0305* (2013.01); *G02F 1/225* (2013.01); *G02F 1/2255* (2013.01); *H04B 10/5561* (2013.01); *G02F 2001/212* (2013.01)

(58) Field of Classification Search
  CPC ... H04B 10/5561; G02F 1/21; G02F 1/0121; G02F 1/0305; G02F 1/225; G02F 1/2255; G02F 2001/212

USPC .......................................................... 398/188
See application file for complete search history.

(56) References Cited

U.S. PATENT DOCUMENTS

| 2007/0053628 | A1* | 3/2007 | Park ....................... G02F 1/0121 385/14 |
| 2007/0102830 | A1 | 5/2007 | Muto et al. |
| 2011/0157673 | A1* | 6/2011 | Mitomi ................. G02F 1/2255 359/279 |
| 2012/0051683 | A1* | 3/2012 | Sugiyama ............... G02F 1/035 385/1 |
| 2013/0322833 | A1 | 12/2013 | Hirayama |

FOREIGN PATENT DOCUMENTS

| JP | 2007-123741 | 5/2007 |
| JP | 2014-029987 | 2/2014 |

* cited by examiner

*Primary Examiner* — Dalzid Singh
(74) *Attorney, Agent, or Firm* — Staas & Halsey LLP

(57) ABSTRACT

An optical module includes: an optical modulator that includes a plurality of electrodes and that performs an optical modulation process by using electrical signals input to the electrodes; and a flexible substrate that has flexibility and has a plurality of wiring patterns used for transferring the electrical signals each of which is input to a different one of the electrodes. The optical modulator includes: a plurality of connecting members that connect together the electrodes and the wiring patterns; and at least one protrusion that has a ground voltage, is connected to the flexible substrate while being positioned on a line segment connecting together two of the connecting members positioned adjacent to each other, and has a cross section of which the size measured in the direction perpendicular to the line segment is larger than the size of the cross section of each of the connecting members.

6 Claims, 5 Drawing Sheets

OPTICAL MODULE AND TRANSMITTING APPARATUS

CROSS-REFERENCE TO RELATED APPLICATION

This application is based upon and claims the benefit of priority of the prior Japanese Patent Application No. 2014-143418, filed on Jul. 11, 2014, the entire contents of which are incorporated herein by reference.

FIELD

The embodiments discussed herein are directed to an optical module and a transmitting apparatus.

BACKGROUND

Conventionally, with optical modulators that modulate light generated by a light source, a Mach-Zehnder interferometer may be used. In those optical modulators, a signal electrode and a ground electrode are provided along parallel optical waveguides. In recent years, because optical modulation methods are diversified, each optical modulator is often provided with two or more Mach-Zehnder interferometers. In those situations, by integrating the two or more Mach-Zehnder interferometers on one chip, it is possible to keep the size of the optical modulator small.

An optical modulator provided with two or more Mach-Zehnder interferometers is able to generate multi-level modulation signals by having a plurality of mutually-different electrical signals input thereto. In other words, by having the mutually-different electrical signals input from an external source to signal electrodes corresponding to the different Mach-Zehnder interferometers, the optical modulator is able to perform an optical modulation process that uses a multi-level modulation method such as a Differential Quadrature Phase Shift Keying (DQPSK) method.

In an electrical signal input section of an optical modulator, a connector may be provided; however, when one connector is provided for each of a plurality of electrical signals, the size of the optical modulator becomes large, and the mounting area increases. To cope with this situation, examples of methods for keeping the apparatus compact includes configuring the electrical signal input section by using a Flexible Printed Circuits (FPC) unit that has flexibility.

More specifically, the FPC unit has a plurality of wiring patterns corresponding to the plurality of signal electrodes of the optical modulator printed thereon, so that the electrical signals output from a driver are input to the optical modulator via the wiring patterns printed on the FPC unit. One end of the FPC unit positioned on the driver side is electrically connected to the driver by, for example, soldering the wiring patterns to electrodes that output the electrical signals supplied from the driver. The other end of the FPC unit positioned on the optical modulator side is electrically connected to the optical modulator by being inserted into a recessed section formed in the optical modulator and further having the wiring patterns soldered onto, for example, signal pins protruding downward from the ceiling face of the recessed section.

Patent Document 1: Japanese Laid-open Patent Publication No. 2007-123741

Patent Document 2: Japanese Laid-open Patent Publication No. 2014-029987

The electrical signals supplied from the driver to the optical modulator are signals having a relatively high frequency (e.g., approximately 30 GHz). When such signals having a high frequency (hereinafter "high frequency signals") are transferred, it is known that, if a plurality of high frequency signal transfer paths are positioned close to each other, crosstalk may occur between the transfer paths. In other words, when the plurality of wiring patterns are printed on the FPC unit, if the wiring patterns are positioned close to each other, a problem arises where the crosstalk occurs, and characteristics of the electrical signals supplied to the optical modulator are thereby degraded.

To cope with this situation, one possible idea that can be used for reducing the occurrence of crosstalk is to enlarge the distance between the wiring patterns. However, since the FPC unit is used for the purpose of making the apparatus compact, it would not be desirable if the FPC unit were made larger as a result of enlarging the distance between the wiring patterns. Accordingly, it turns out that the plurality of wiring patterns are positioned apart from each other within the limit of the size of the FPC unit. It is therefore difficult to reduce the occurrence of crosstalk by a sufficient amount.

Further, another possible idea that can be used for reducing the occurrence of crosstalk is to form a ground pattern in the entire area of the FPC unit excluding the areas with the wiring patterns, so as to prevent electric fields from expanding from the wiring patterns. However, even if the ground pattern is formed in a large area, there is a limit to the effect achieved in reducing the occurrence of crosstalk. In addition, because the FPC unit is reinforced by the ground pattern, flexibility and pliability of the FPC unit are impaired. As explained above, it is difficult to reduce the occurrence of crosstalk by a sufficient amount, by simply enlarging the distance between the wiring patterns or providing the ground pattern having a large area.

SUMMARY

According to an aspect of an embodiment, an optical module includes: an optical modulator that includes a plurality of electrodes and that performs an optical modulation process by using electrical signals input to the plurality of electrodes; and a flexible substrate that has flexibility and has a plurality of wiring patterns used for transferring the electrical signals each of which is input to a different one of the plurality of electrodes. The optical modulator includes: a plurality of connecting members that connect together the plurality of electrodes and the plurality of wiring patterns; and at least one protrusion that has a ground voltage, is connected to the flexible substrate while being positioned on a line segment connecting together two of the connecting members positioned adjacent to each other, and has a cross section of which a size measured in a direction perpendicular to the line segment is larger than a size of a cross section of each of the connecting members.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Exemplary embodiments of an optical module and a transmitting apparatus of the present disclosure will be explained in detail below, with reference to the accompanying drawings. The present disclosure is not limited to the exemplary embodiments.

[a] First Embodiment

Figure 1:
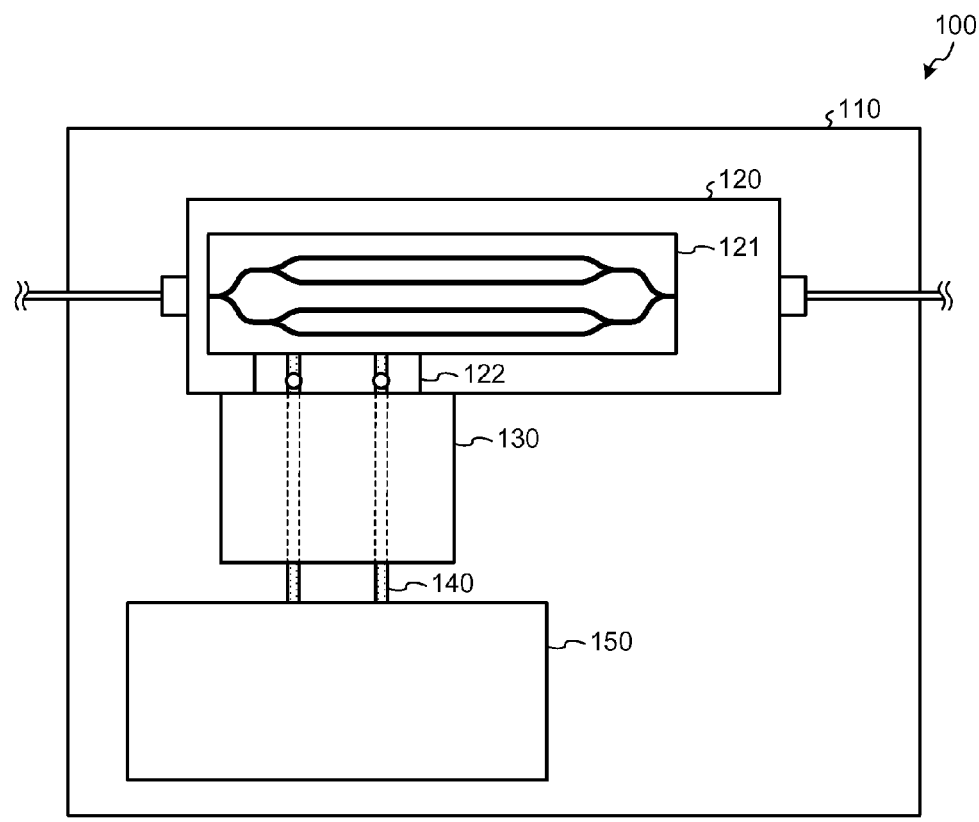
FIG. 1 is a schematic plan view of an optical module according to a first embodiment.

FIG. 1 is a schematic plan view of an optical module 100 according to a first embodiment. The optical module 100 illustrated in FIG. 1 includes a Printed Circuits Board (PCB) 110, an optical modulator 120, a Flexible Printed Circuits (FPC) unit 130, electrodes 140, and a driver 150.

The PCB 110 is configured with, for example, a glass epoxy substrate and has various types of component parts that structure the optical module 100 mounted thereon.

The optical modulator 120 modulates light generated by a light source and outputs an optical signal. At that time, the optical modulator 120 performs the optical modulation process on the basis of electrical signals output from the driver 150. More specifically, the optical modulator 120 includes a modulator chip 121 and a relay substrate 122.

The modulator chip 121 includes optical waveguides parallel to each other, signal electrodes, and ground electrodes and is configured to perform the optical modulation process on the basis of the electrical signals supplied to the signal electrodes, while transferring the light from the light source through the optical waveguides. More specifically, the optical waveguides are structured by, for example, forming a metal film of titanium (Ti) or the like on a part of a crystal substrate configured with electro-optic crystals of lithium niobate ($LiNbO_3$ (LN)) or lithium tantalite ($LiTaO_2$) and applying thermal diffusion thereto. Alternatively, the optical waveguides may be structured by performing a proton exchange process in benzoic acid after a patterning process. Further, the signal electrodes and the ground electrodes are coplanar electrodes that are formed along the parallel optical waveguides. In FIG. 1, because two sets of parallel optical waveguides are formed on the modulator chip 121, a signal electrode and a ground electrode are formed in correspondence with each of the sets of optical waveguides. The signal electrodes and the ground electrodes are, for example, formed on each of the optical waveguides through a patterning process. Further, to prevent the light transferred through the optical waveguides from being absorbed by the signal electrodes and the ground electrodes, a buffer layer is provided between the crystal substrate and the signal and ground electrodes. As for the buffer layer, for example, silicon dioxide ($SiO_2$) or the like formed with a thickness of approximately 0.2 to 2 μm may be used.

The relay substrate 122 relays the electrical signals input thereto from the FPC unit 130 to the modulator chip 121, so as to input the electrical signals to the signal electrodes of the modulator chip 121. In FIG. 1, the relay substrate 122 has two wiring patterns corresponding to the two signal electrodes formed on the modulator chip 121. To input the electrical signals to the plurality of signal electrodes formed on the modulator chip 121, when signal input sections for all the electrical signals are arranged in a row on one side of the optical modulator 120, it is possible to facilitate the mounting process and to keep the mounting area small. For this reason, in the first embodiment, the optical modulator 120 is provided with the relay substrate 122, so that the electrical signals that are input from the one side of the optical modulator 120 are relayed to the modulator chip 121 by the relay substrate 122.

The FPC unit 130 is a flexible substrate having flexibility and is configured to supply the electrical signals output from the driver 150 to the optical modulator 120. In other words, one end of the FPC unit 130 is electrically connected to the relay substrate 122 provided for the optical modulator 120. The other end of the FPC unit 130 is electrically connected to the driver 150. On the surface of the FPC unit 130 positioned on the PCB 110 side, wiring patterns for transferring electrical signals are formed. In the first embodiment, two wiring patterns connected to the two wiring patterns formed on the relay substrate 122 are formed on the FPC unit 130. In contrast, on the surface of the FPC unit 130 positioned away from the PCB 110, a ground pattern having a ground voltage is formed.

The electrodes 140 are electrodes printed on the PCB 110 and are configured to transfer the electrical signals output from the driver 150 to the FPC unit 130. The electrodes 140 and the wiring patterns of the FPC unit 130 are soldered together.

The driver 150 generates the electrical signals used for modulating the light from the light source. In other words, the driver 150 generates the electrical signals having a high frequency of which the amplitude and the phase are in accordance with transmission data. The driver 150 drives the optical modulator 120 by using the electrical signals.

Figure 2:
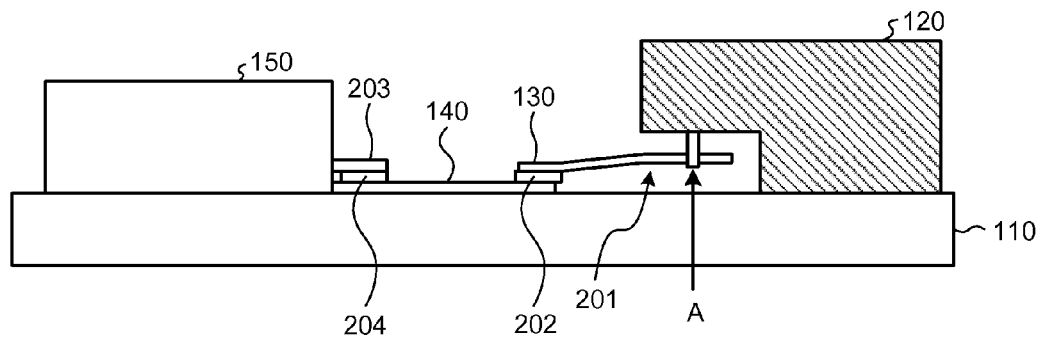
FIG. 2 is a schematic lateral view of the optical module according to the first embodiment.

Next, the electrical connections between the optical modulator 120, the FPC unit 130, and the driver 150 will be explained, with reference to FIG. 2. FIG. 2 is a schematic lateral view of the optical module 100 according to the first embodiment.

As illustrated in FIG. 2, the optical modulator 120 has a recessed section 201 formed in the vicinity of the PCB 110. The one end of the FPC unit 130 is inserted into the recessed section 201 formed in the optical modulator 120 and is connected to the optical modulator 120 on the inside of the recessed section 201. In other words, the FPC unit 130 and the optical modulator 120 are electrically connected to each other, by arranging a plurality of pins protruding downward from the ceiling face of the recessed section 201 to go through through holes formed in the FPC unit 130 and fixing the pins by soldering. A specific configuration of the connecting section between the FPC unit 130 and the optical modulator 120 will be explained in detail later.

One end of the FPC unit 130 positioned on the driver 150 side is soldered onto the electrodes 140. In other words, the wiring patterns formed on the FPC unit 130 and the electrodes 140 are electrically connected to each other by solder 202. The driver 150 and the electrodes 140 are electrically connected to each other by soldering lead pins 203 protruding from the driver 150 onto the electrodes 140. In other words, the lead pins 203 from the driver 150 are connected to the electrodes 140 via solder 204.

Figure 3:
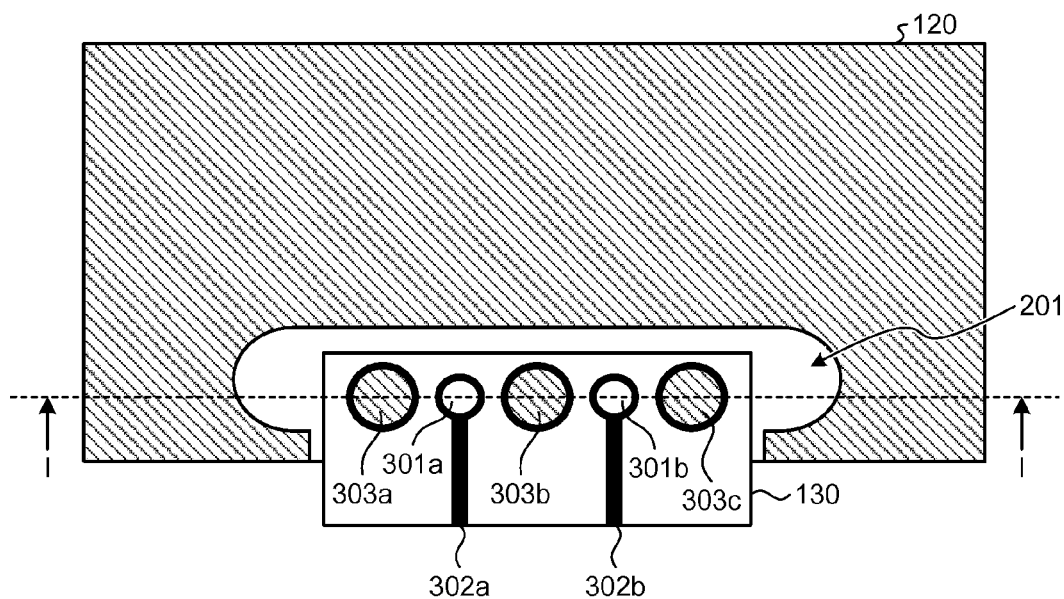
FIG. 3 is a drawing illustrating a connecting section according to the first embodiment.
Figure 4:
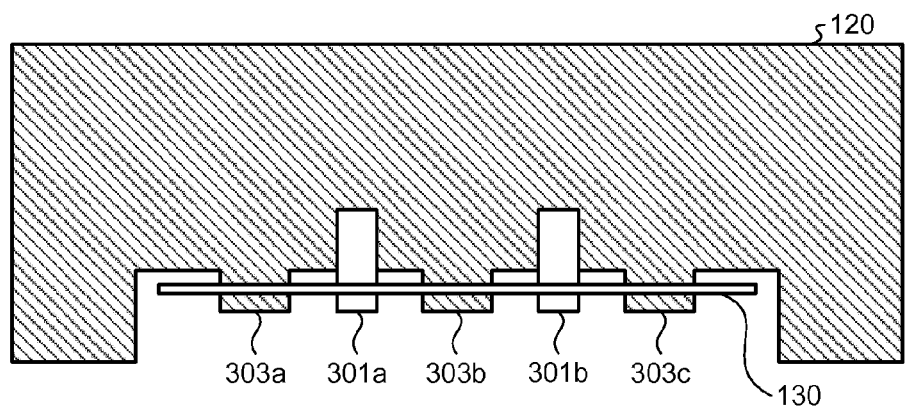
FIG. 4 is a drawing illustrating a cross section at the line I-I in FIG. 3.

Next, the connecting section between the optical modulator 120 and the FPC unit 130 will be explained in detail, with reference to FIGS. 3 and 4. FIG. 3 is a drawing illustrating the connecting section according to the first embodiment. FIG. 3 illustrates a configuration of the connecting section viewed in the direction of an arrow A in FIG. 2. FIG. 4 is a drawing illustrating a cross section at the line I-I in FIG. 3.

As illustrated in FIGS. 3 and 4, signal pins 301a and 301b each of which has a circular cross section protrude from the optical modulator 120. The signal pins 301a and 301b are arranged to go through the through holes formed in the FPC unit 130 and are fixed by soldering. Further, wiring patterns 302a and 302b are connected to lands formed in surrounding areas of the through holes penetrated by the signal pins 301a and 301b, respectively.

Further, ground pins 303a, 303b, and 303c each of which has a circular cross section protrude from the optical modulator 120. The ground pins 303a, 303b, and 303c are arranged to go through the through holes formed in the FPC unit 130 and are fixed by soldering. In this manner, the optical modulator 120 and the FPC unit 130 are connected to each other by arranging the plurality of pins protruding from the optical modulator 120 to go through the through holes formed in the FPC unit 130 and fixing the pins by soldering.

In this situation, the signal pins 301a and 301b are connecting component parts used for connecting together the wiring patterns formed on the relay substrate 122 provided inside the optical modulator 120 and the wiring patterns 302a and 302b formed on the FPC unit 130. The signal pins 301a and 301b may be configured by using coaxial pins, for example. In contrast, the ground pins 303a, 303b, and 303c are protrusions formed on an outer frame of the optical modulator 120. Because the outer frame of the optical modulator 120 is a conductive member having a ground voltage, the ground pins 303a, 303b, and 303c also have the ground voltage. The ground pins 303a, 303b, and 303c are connected to a ground pattern formed on such a surface of the FPC unit 130 that is opposite from the surface on which the wiring patterns 302a and 302b are formed.

The signal pins 301a and 301b and the ground pins 303a, 303b, and 303c are positioned so as to alternate. In particular, the ground pin 303b is positioned between the signal pins 301a and 301b and has a circular cross section that is larger in diameter than the cross section of each of the signal pins 301a and 301b. With this arrangement, the ground pin 303b serves as blockage between the signal pins 301a and 301b. It is therefore possible to reduce the crosstalk occurring between the signal pin 301a and the signal pin 301b.

More specifically, the ground pin 303b is positioned on a line segment connecting the signal pins 301a and 301b together. Further, when the sizes of the cross sections are compared among the pins with respect to the direction perpendicular to the line segment connecting the signal pins 301a and 301b together, the cross section of the ground pin 303b is larger than the cross section of each of the signal pins 301a and 301b. Thus, the ground pin 303b serves as the blockage between the signal pins 301a and 301b. As a result, the electric fields are prevented from expanding from the signal pins 301a and 301b, and it is therefore possible to reduce the crosstalk occurring at the connecting section.

Further, what is dominant among crosstalk phenomena occurring in the entirety of the FPC unit 130 is not crosstalk occurring between the wiring patterns 302a and 302b, but is crosstalk occurring at the connecting section in the vicinity of the signal pins 301a and 301b. Accordingly, by reducing the crosstalk occurring at the connecting section, it is possible to reduce the crosstalk for the entirety of the FPC unit 130 by a sufficient amount.

Further, when using the configuration described above in which the crosstalk is reduced by the ground pin 303b, there is no need to form a ground pattern in the entire area on the surface of the FPC unit 130 on which the wiring patterns 302a and 302b are formed. Thus, the flexibility and the pliability of the FPC unit 130 are not impaired.

Next, the connections between the optical modulator 120 and the FPC unit 130 realized by the signal pins 301a and 301b will be explained.

Figure 5:
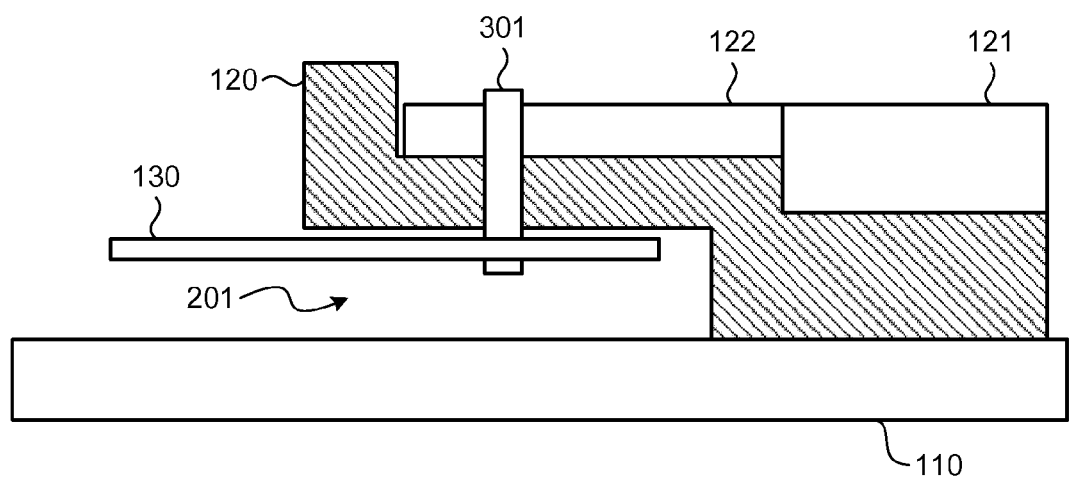
FIG. 5 is a drawing for explaining connections realized by signal pins.
Figure 6:
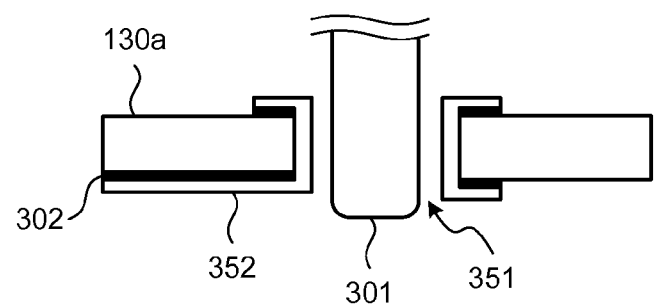
FIG. 6 is a drawing illustrating a connecting part between a signal pin and an FPC unit.

FIG. 5 is a drawing illustrating the connecting section between the optical modulator 120 and the FPC unit 130. In FIG. 5, some of the elements that are the same as those in FIGS. 1 and 2 are referred to by using the same reference characters. In FIG. 5, a signal pin that is the same as the signal pin 301a or 301b is illustrated as a signal pin 301. FIG. 6 is an enlarged view of the vicinity of a through hole that is formed in the FPC unit 130 and is penetrated by the signal pin 301.

As illustrated in FIG. 5, the signal pin 301 goes through the relay substrate 122 and the outer frame of the optical modulator 120 so as to protrude downward from the ceiling face of the recessed section 201. Further, the tip end of the protruding signal pin 301 goes through the through hole formed in the FPC unit 130. On both of the surfaces of the FPC unit 130, the signal pin 301 is soldered onto lands formed on the FPC unit 130, so that the FPC unit 130 is fixed by the signal pin 301.

Similarly, the tip end of each of the ground pins 303a, 303b, and 303c also goes through a through hole formed in the FPC unit 130. On both of the surfaces of the FPC unit 130, the ground pins 303a, 303b, and 303c are soldered onto lands formed on the FPC unit 130. It is noted that, however, because the ground pins 303a, 303b, and 303c are protrusions formed on the outer frame of the optical modulator 120, the ground pins 303a, 303b, and 303c do not go through the relay substrate 122 and the like.

At the connecting part between the signal pin 301 and the FPC unit 130, the through hole illustrated in FIG. 6 is formed. In other words, a through hole 351 is formed in an FPC core 130a serving as a base member of the FPC unit 130, and also, the soldering-purpose lands are formed in surrounding areas of the through hole 351. Further, to the land formed on one of the surfaces of the FPC unit 130, the wiring pattern 302 is connected. Further, the wiring pattern 302, the lands formed on the two surfaces of the FPC core 130a, and the inner surface of the through hole 351 are coated by metal plating 352. In this manner, at the through hole, because the lands formed on the two surfaces of the FPC core 130a are connected to each other by the metal plating 352 that coats the inner surface of the through hole 351, it is possible to arrange the two surfaces of the FPC core 130a to be in an electrically conductive state.

Similarly, the ground pins 303a, 303b, and 303c are also fixed by being soldered in the through holes configured in such a manner that the lands formed on the two surfaces of the FPC core 130a are connected to each other by metal plating. It is noted that, however, at each of the through holes in which the ground pins 303a, 303b, and 303c are fixed by being soldered, the ground pattern is connected to the land formed in the surrounding area of the through hole, on such a surface of the FPC core 130a that is opposite from the surface on which the wiring pattern 302 is formed.

As explained above, in the first embodiment, the ground pin having a diameter larger than the diameter of each of the signal pins is positioned on the line segment connecting the plurality of signal pins together, so that the optical modulator and the FPC unit are connected to each other by the signal pins and the ground pins. Thus, because the ground pin serves as the blockage between the plurality of signal pins, it is possible to reduce the crosstalk occurring at the connecting section that accounts for a large percentage of the crosstalk occurring in the entirety of the FPC unit. In other words, it is possible to reduce the crosstalk occurring in the flexible substrate having the plurality of wiring patterns formed thereon.

In the first embodiment described above, each of the ground pins 303a and 303c other than the ground pin 303b is also assumed to have a diameter larger than the diameter of each of the signal pins 301a and 301b. However, the ground pins 303a and 303c, which are not positioned between the two signal pins, does not necessarily have to have a larger diameter. The ground pins 303a and 303c may each have a diameter equal to the diameter of each of the signal pins.

[b] Second Embodiment

A characteristic of a second embodiment lies in that the size of each of the ground pins measured in the direction parallel to a line segment connecting the signal pins together is equal to the size of each of the signal pins, so as to keep the pitch between the plurality of pins small.

A configuration of the optical module 100 according to the second embodiment is the same as that in the first embodiment. Thus, the explanation thereof will be omitted. In the second embodiment, the connecting section between the optical modulator 120 and the FPC unit 130 is different from that in the first embodiment.

Figure 7:
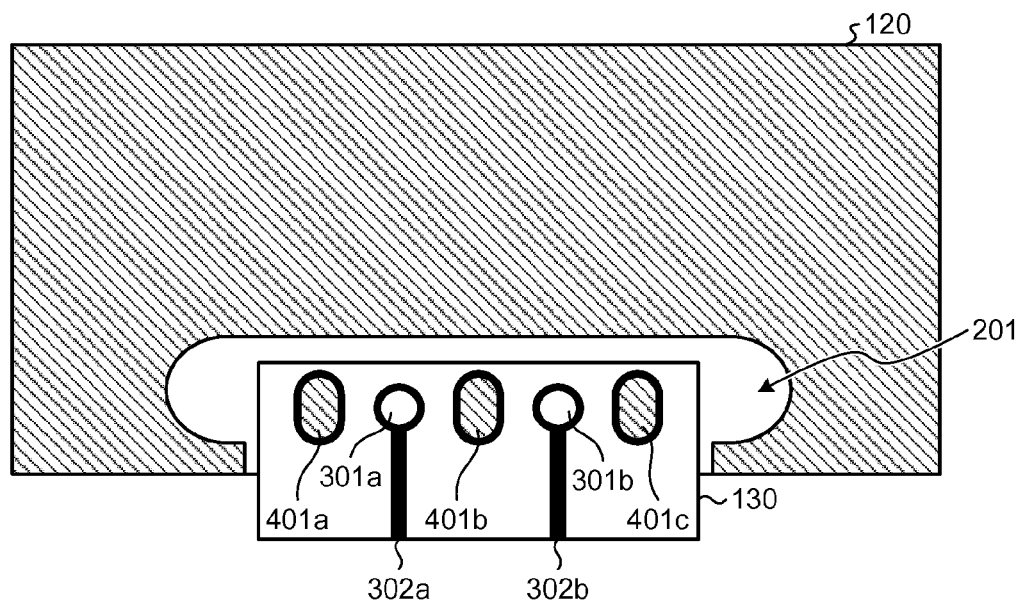
FIG. 7 is a drawing illustrating a connecting section according to a second embodiment.

FIG. 7 is a drawing illustrating the connecting section according to the second embodiment. In FIG. 7, some of the elements that are the same as those in FIG. 3 are referred to by using the same reference characters.

As illustrated in FIG. 7, the signal pins 301a and 301b each of which has a circular cross section protrude from the optical modulator 120. The signal pins 301a and 301b are arranged to go through the through holes formed in the FPC unit 130 and are fixed by soldering. Further, to the lands formed in the surrounding areas of the signal pins 301a and 301b, the wiring patterns 302a and 302b are connected, respectively.

Further, ground pins 401a, 401b, and 401c each of which has an oval cross section protrude from the optical modulator 120. The ground pins 401a, 401b, and 401c are arranged to go through the through holes formed in the FPC unit 130 and are fixed by soldering. In this manner, the optical modulator 120 and the FPC unit 130 are connected to each other by arranging the plurality of pins protruding from the optical modulator 120 to go through the through holes formed in the FPC unit 130 and fixing the pins by soldering.

The ground pins 401a, 401b, and 401c are protrusions formed on the outer frame of the optical modulator 120. Because the outer frame of the optical modulator 120 is a conductive member having a ground voltage, the ground pins 401a, 401b, and 401c also have the ground voltage. The ground pins 401a, 401b, and 401c are connected to the ground pattern formed on such a surface of the FPC unit 130 that is opposite from the surface on which the wiring patterns 302a and 302b are formed.

The signal pins 301a and 301b and the ground pins 401a, 401b, and 401c are positioned so as to alternate. In particular, the ground pin 401b is positioned between the signal pins 301a and 301b and has a cross section in a shape elongated in the direction perpendicular to a line segment connecting the signal pins 301a and 301b together. With this arrangement, the ground pin 401b serves as blockage between the signal pins 301a and 301b. It is therefore possible to reduce the crosstalk occurring between the signal pin 301a and the signal pin 301b.

More specifically, the ground pin 401b is positioned on the line segment connecting the signal pins 301a and 301b together. Further, when the sizes of the cross sections are compared among the pins with respect to the direction perpendicular to the line segment connecting the signal pins 301a and 301b together, the cross section of the ground pin 401b is larger than the cross section of each of the signal pins 301a and 301b. Thus, the ground pin 401b serves as the blockage between the signal pins 301a and 301b. As a result, the electric fields are prevented from expanding from the signal pins 301a and 301b, and it is therefore possible to reduce the crosstalk occurring at the connecting section.

Further, when the sizes of the cross sections are compared among the pins with respect to the direction parallel to the line segment connecting the signal pins 301a and 301b together, the size of the cross section of even the ground pin 401b is equal to that of the cross section of each of the signal pins 301a and 301b. In other words, the cross section of the ground pin 401b has an oval shape elongated in the direction perpendicular to the line segment connecting the signal pins 301a and 301b together. Accordingly, even if the plurality of pins are arranged in a row in the width direction of the FPC unit 130, the pitch between the adjacently-positioned pins is not increased, and it is therefore possible to avoid the situation where the size of the FPC unit 130 becomes large.

Figure 8:
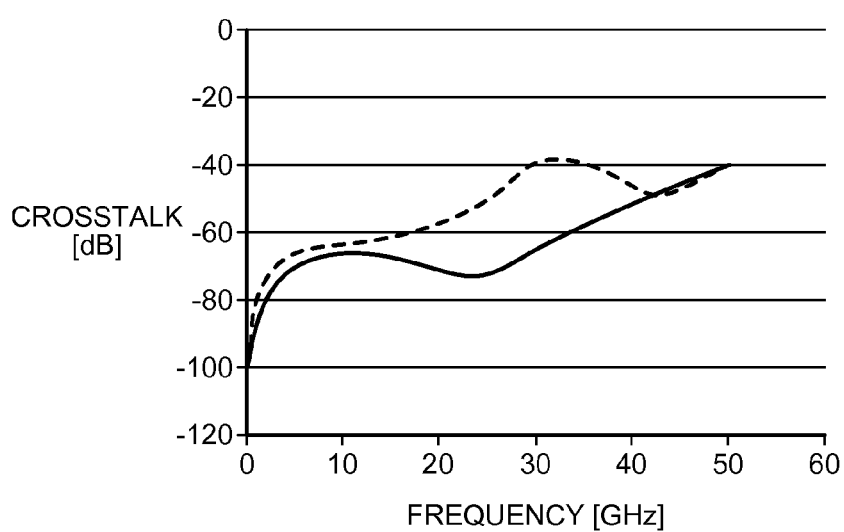
FIG. 8 is a chart illustrating specific examples of magnitudes of crosstalk.

FIG. 8 is a chart comparing the magnitude of crosstalk in the FPC unit 130 having the connecting section described above with the magnitude of crosstalk in an FPC unit on which a ground pattern is formed in the entire area of the surface on which wiring patterns are formed. In FIG. 8, the solid line indicates the magnitude of the crosstalk in the FPC unit 130 according to the second embodiment, whereas the broken line indicates the magnitude of the cross talk in the FPC unit having the ground pattern that has a large area.

As apparent from FIG. 8, when high frequency signals of approximately 30 GHz are transferred, for example, the crosstalk occurring in the FPC unit 130 according to the second embodiment is approximately −65 decibels (dB). In contrast, the crosstalk occurring in the FPC unit having the ground pattern that has a large area is approximately −40 dB. As explained here, by arranging the ground pin 401b to be positioned between the signal pins 301a and 301b, it is possible to reduce the crosstalk occurring when the high frequency signals are transferred.

This observation signifies that, what is dominant among crosstalk phenomena occurring in the entirety of the FPC unit 130 is not crosstalk occurring between the wiring patterns 302a and 302b, but is crosstalk occurring at the connecting section in the vicinity of the signal pins 301a and 301b. Further, at the connecting section between the optical modulator 120 and the FPC unit 130 according to the second embodiment, because the crosstalk is reduced by the ground pin 401b, it is possible to reduce the crosstalk for the entirety of the FPC unit 130 by a sufficient amount. Further, on the FPC unit 130 according to the second embodiment, because no ground pattern is formed in the entire area of the surface on which the wiring patterns 302a and 302b are formed, the flexibility and the pliability of the FPC unit 130 are not impaired.

As explained above, according to the second embodiment, the ground pin having the cross section elongated in the direction perpendicular to the line segment connecting the plurality of signal pins together is positioned on the line segment, so that the optical modulator and the FPC unit are connected to each other by the signal pins and the ground pins. Thus, because the ground pin serves as the blockage between the plurality of signal pins, it is possible to reduce the crosstalk occurring at the connecting section that accounts for a large percentage of the crosstalk occurring in the entirety of the FPC unit. In other words, it is possible to reduce the crosstalk occurring in the flexible substrate having the plurality of wiring patterns formed thereon. In addition, because the width of the ground pin is equal to the width of each of the signal pins, the pitch between the adjacently-positioned pins is not increased, and it is therefore possible to avoid the situation where the size of the flexible substrate becomes large.

In the second embodiment described above, each of the ground pins 401a and 401c other than the ground pin 401b is also assumed to have an oval cross section. However, the ground pins 401a and 401c, which are not positioned between the two signal pins, may have a cross section in the same shape as that of each of the signal pins.

[c] Third Embodiment

A characteristic of a third embodiment lies in that processing of the FPC unit is facilitated by providing the FPC unit with at least one cut-out section, so that at least one of the ground pins having a cross section in an elongated shape and serving as blockage between the signal pins is inserted into the cut-out section formed in the FPC unit.

A configuration of the optical module 100 according to the third embodiment is the same as that in the first embodiment. Thus, the explanation thereof will be omitted. In the third embodiment, the connecting section between the optical modulator 120 and the FPC unit 130 is different from that in the first embodiment.

Figure 9:
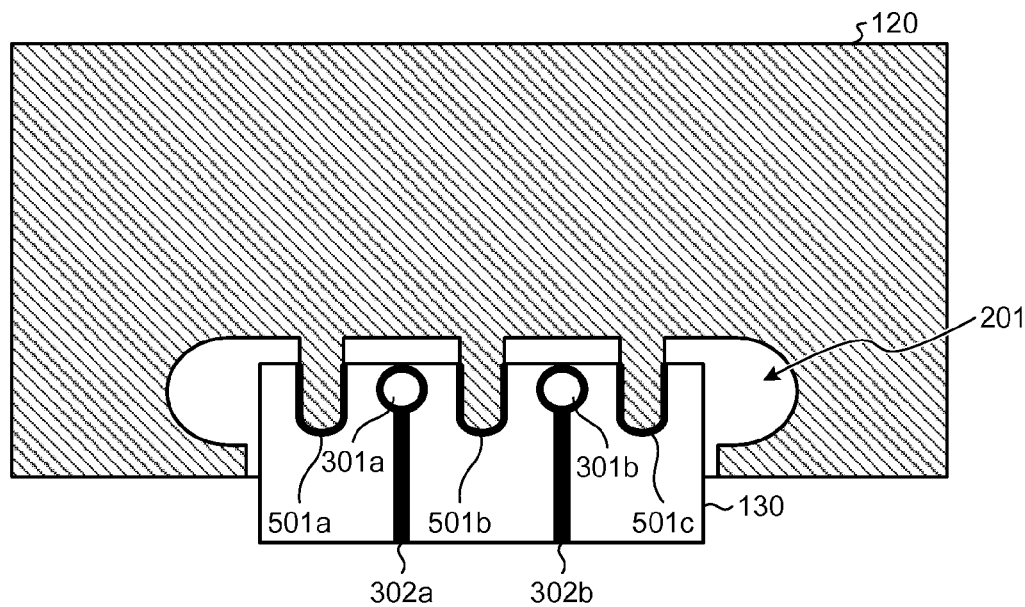
FIG. 9 is a drawing illustrating a connecting section according to a third embodiment.

FIG. 9 is a drawing illustrating the connecting section according to the third embodiment. In FIG. 9, some of the elements that are the same as those in FIG. 3 are referred to by using the same reference characters.

As illustrated in FIG. 9, the signal pins 301a and 301b each of which has a circular cross section protrude from the optical modulator 120. The signal pins 301a and 301b are arranged to go through the through holes formed in the FPC unit 130 and are fixed by soldering. Further, to the lands formed in the surrounding areas of the signal pins 301a and 301b, the wiring patterns 302a and 302b are connected, respectively.

Ground pins 501a, 501b, and 501c each of which has an oval cross section protrude from the optical modulator 120. The ground pins 501a, 501b, and 501c are inserted into cut-out sections formed in an end part of the FPC unit 130. Further, such parts of the ground pins 501a, 501b, and 501c that are inserted in the cut-out sections are soldered onto lands formed in surrounding areas of the cut-out sections. In this manner, the optical modulator 120 and the FPC unit 130 are connected to each other by arranging the signal pins 301a and 301b to go through the through holes formed in the FPC unit 130 and to be fixed by soldering, and also arranging the ground pins 501a, 501b, and 501c to be inserted into the cut-out sections formed in the FPC unit 130 and to be fixed by soldering.

The ground pins 501a, 501b, and 501c are protrusions formed on the outer frame of the optical modulator 120. As illustrated in FIG. 9, the ground pins 501a, 501b, and 501c may be formed so as to continue from the abutted face of the recessed section 201 into which the FPC unit 130 is inserted. Because the outer frame of the optical modulator 120 is a conductive member having a ground voltage, the ground pins 501a, 501b, and 501c also have the ground voltage. The ground pins 501a, 501b, and 501c are connected to a ground pattern formed on such a surface of the FPC unit 130 that is opposite from the surface on which the wiring patterns 302a and 302b are formed.

The signal pins 301a and 301b and the ground pins 501a, 501b, and 501c are positioned so as to alternate. In particular, the ground pin 501b is positioned between the signal pins 301a and 301b and has a cross section in a shape elongated in the direction perpendicular to a line segment connecting the signal pins 301a and 301b together. With this arrangement, the ground pin 501b serves as blockage between the signal pins 301a and 301b. It is therefore possible to reduce the crosstalk occurring between the signal pin 301a and the signal pin 301b.

More specifically, the ground pin 501b is positioned on the line segment connecting the signal pins 301a and 301b together. Further, when the sizes of the cross sections are compared among the pins with respect to the direction perpendicular to the line segment connecting the signal pins 301a and 301b together, the cross section of the ground pin 501b is larger than the cross section of each of the signal pins 301a and 301b. Thus, the ground pin 501b serves as the blockage between the signal pins 301a and 301b. As a result, the electric fields are prevented from expanding from the signal pins 301a and 301b, and it is therefore possible to reduce the crosstalk occurring at the connecting section.

In addition, in the end part of the FPC unit 130, the cut-out sections each shaped so as to fit a part of the outer circumference of the cross section of a corresponding one of the ground pins 501a, 501b, and 501c are formed. The ground pins 501a, 501b, and 501c are inserted into the cut-out sections formed in the end part of the FPC unit 130. Thus, even if each of the ground pins 501a, 501b, and 501c has the oval cross section, there is no need to form through holes in the FPC unit 130 each having the same shape as the oval cross section. Accordingly, the processing of the FPC unit 130 is facilitated, and it is therefore possible to improve the efficiency in the manufacture of the optical module 100.

As explained above, according to the third embodiment, the ground pin having the cross section elongated in the direction perpendicular to the line segment connecting the plurality of signal pins together is positioned on the line segment, so that the ground pin is inserted into the cut-out section formed in the end part of the FPC unit. Thus, because the ground pin serves as the blockage between the plurality of signal pins, it is possible to reduce the crosstalk occurring at the connecting section that accounts for a large percentage of the crosstalk occurring in the entirety of the FPC unit. In other words, it is possible to reduce the crosstalk occurring in the flexible substrate having the plurality of wiring patterns formed thereon. In addition, because there is no need to form, in the flexible substrate, a through hole having the same shape as the cross section of the ground pin, it is possible to facilitate the processing of the flexible substrate.

In the third embodiment described above, each of the ground pins 501a and 501c other than the ground pin 501b is also assumed to have an oval cross section. However, the ground pins 501a and 501c, which are not positioned between the two signal pins, may have a cross section in the same shape as that of each of the signal pins. In that situation, the ground pins 501a and 501c may be arranged to go through through holes formed in the FPC unit 130, in the same manner as the signal pins 301a and 301b are.

Further, in any of the embodiments described above, the signal pins 301a and 301b may be configured by using coaxial pins, for example. Alternatively, for example, one or more feedthrough elements may be used as connecting component parts between the optical modulator 120 and the FPC unit 130. Further, the number of signal pins used for connecting the optical modulator 120 and the FPC unit 130 to each other may be three or more. In that situation, it is desirable if a ground pin that serves as blockage between two signal pins is provided between every two signal pins that are positioned adjacent to each other. Further, the cross section of each of the signal pins 301a and 301b does not necessarily have to be circular and may be in any other arbitrary shape. Similarly, the cross section of each of the ground pins does not necessarily have to be circular or oval and may be in any other arbitrary shape such as a square or a rectangle.

Figure 10:
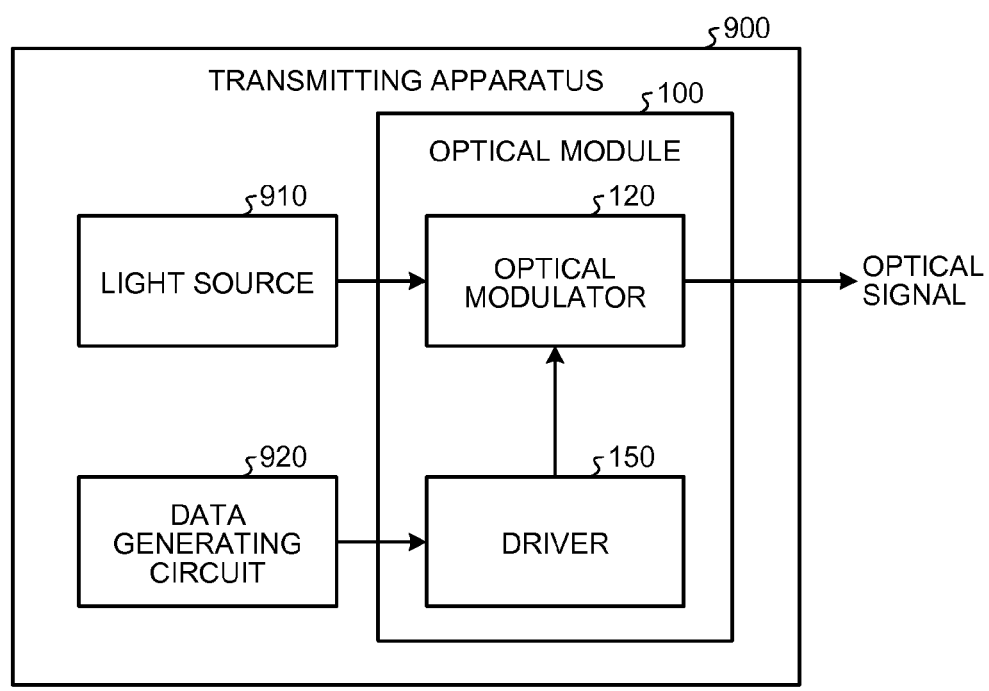
FIG. 10 is a block diagram of an exemplary configuration of a transmitting apparatus.

The optical module 100 explained in the embodiments above may be, for example, provided in a transmitting apparatus configured to transmit optical signals. FIG. 10 is a block diagram of an exemplary configuration of such a transmitting apparatus 900. As illustrated in FIG. 10, the transmitting apparatus 900 includes the optical module 100, a light source 910, and a data generating circuit 920.

The light source 910 includes, for example, a laser diode (LD) or the like and is configured to generate light. Further, the light generated by the light source 910 is input to the optical modulator 120 included in the optical module 100.

The data generating circuit 920 generates transmission data. The transmission data is input to the driver 150 included in the optical module 100, so that the driver 150 generates high frequency signals having a waveform corresponding to the transmission data. Further, the high frequency signals are supplied from the driver 150 to the optical modulator 120, so that an optical modulation process based on the high frequency signals is performed. Further, the optical signals obtained as a result of the optical modulation process performed by the optical modulator 120 are transmitted through, for example, an optical fiber.

In this situation, as explained in the embodiments above, the optical modulator 120 and the driver 150 are connected to each other by the FPC unit 130 having the plurality of wiring patterns formed thereon, and the crosstalk occurring in the connection between the optical modulator 120 and the FPC unit 130 is reduced. Consequently, the waveform of the high frequency signals supplied from the driver 150 to the optical modulator 120 is prevented from being degraded, and the transmitting apparatus 900 is thus able to transmit the transmission data with an excellent level of precision.

According to at least one aspect of the optical module and the transmitting apparatus disclosed herein, an advantageous effect is achieved where it is possible to reduce the crosstalk occurring in the flexible substrate having the plurality of wiring patterns formed thereon.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module comprising:
an optical modulator that includes a plurality of electrodes and that performs an optical modulation process by using electrical signals input to the plurality of electrodes; and
a flexible substrate that has flexibility and has a plurality of wiring patterns used for transferring the electrical signals each of which is input to a different one of the plurality of electrodes, wherein
the optical modulator includes:
 a plurality of connecting members that connect together the plurality of electrodes and the plurality of wiring patterns; and
 at least one protrusion that has a ground voltage, is connected to the flexible substrate while being positioned on a line segment connecting together two of the connecting members positioned adjacent to each other, and has a cross section of which a size measured in a direction perpendicular to the line segment is larger than a size of a cross section of each of the connecting members.

2. The optical module according to claim 1, wherein
the cross section of each of the connecting members is circular, and
the cross section of the protrusion is circular and is larger in diameter than the cross section of each of the connecting members.

3. The optical module according to claim 1, wherein
the cross section of each of the connecting members is circular, and
a size of the cross section of the protrusion measured in a direction parallel to the line segment is equal to a size of the cross section of each of the connecting members.

4. The optical module according to claim 1, wherein
the flexible substrate has a through hole section in which through holes are formed to have same shapes as the cross sections of the connecting members and the protrusion, and
the connecting members and the protrusion go through the through holes formed in the through hole section.

5. The optical module according to claim 1, wherein
the flexible substrate has, in an end part thereof, a cut-out section formed so as to fit a part of an outer circumference of the cross section of the protrusion, and
the protrusion is inserted into the cut-out section formed in the end part.

6. A transmitting apparatus comprising:
a light source that generates light;
an optical modulator that includes a plurality of electrodes and that performs an optical modulation process by using electrical signals input to the plurality of electrodes;
a driver that generates electrical signals corresponding to transmission data; and
a flexible substrate that has flexibility and has a plurality of wiring patterns used for transferring each of the electrical signals generated by the driver to a different one of the plurality of electrodes, wherein
the optical modulator includes:

a plurality of connecting members that connect together the plurality of electrodes and the plurality of wiring patterns; and at least one protrusion that has a ground voltage, is connected to the flexible substrate while being positioned on a line segment connecting together two of the connecting members positioned adjacent to each other, and has a cross section of which a size measured in a direction perpendicular to the line segment is larger than a size of a cross section of each of the connecting members.

* * * * *